United States Patent
Inagaki et al.

(10) Patent No.: US 7,268,665 B2
(45) Date of Patent: Sep. 11, 2007

(54) VEHICLE ANTI-THEFT APPARATUS

(75) Inventors: Osamu Inagaki, Aichi (JP); Yuuji Shibagaki, Aichi (JP); Kimitake Takamura, Yokohama (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 296 days.

(21) Appl. No.: 10/990,752

(22) Filed: Nov. 17, 2004

(65) Prior Publication Data

US 2005/0151618 A1   Jul. 14, 2005

(30) Foreign Application Priority Data

Nov. 18, 2003   (JP)   ............................. 2003-388436

(51) Int. Cl.
*B60R 25/00*   (2006.01)

(52) U.S. Cl. .................. 340/5.72; 340/5.61; 340/5.64; 340/5.65; 340/5.1; 340/5.2; 340/5.7; 340/5.6; 307/10.1; 307/10.2; 307/10.5

(58) Field of Classification Search ............... 340/5.72, 340/5.23, 5.1, 5.2, 5.7, 5.61, 5.6, 5.64, 5.65, 340/825.72, 825.69; 307/10.1, 10.2, 10.5
See application file for complete search history.

(56) References Cited

U.S. PATENT DOCUMENTS

| | | | |
|---|---|---|---|
| 5,640,139 A | * | 6/1997 | Egeberg ..................... 307/10.2 |
| 5,796,178 A | * | 8/1998 | Onuma ................... 340/825.72 |
| 5,864,297 A | * | 1/1999 | Sollestre et al. ........... 340/5.72 |
| 5,922,073 A | * | 7/1999 | Shimada ........................ 726/6 |
| 6,271,745 B1 | * | 8/2001 | Anzai et al. ................ 340/5.72 |
| 6,717,508 B2 | * | 4/2004 | Sashida ...................... 340/5.72 |
| 7,051,196 B2 | * | 5/2006 | Angelo et al. .................. 713/1 |

FOREIGN PATENT DOCUMENTS

JP      11-091510      4/1999

* cited by examiner

*Primary Examiner*—Brian Zimmerman
*Assistant Examiner*—Vernal Brown
(74) *Attorney, Agent, or Firm*—Patterson, Thuente, Skaar & Christensen, P.A.

(57) ABSTRACT

An anti-theft apparatus including a first memory, which stores an ID code registered in a portable device, a GPS receiver, which determines the present position of the vehicle, a second memory, which stores a predetermined registered position, and a control circuit, which enables registration of the ID code to the first memory when the present position of the vehicle matches the registered position stored in the second memory.

20 Claims, 2 Drawing Sheets

VEHICLE ANTI-THEFT APPARATUS

CROSS-REFERENCE TO RELATED APPLICATIONS

This application is based upon and claims the benefit of priority from prior Japanese Patent Application No. 2003-388436, filed on Nov. 18, 2003, the entire contents of which are incorporated herein by reference.

BACKGROUND OF THE INVENTION

The present invention relates to a vehicle anti-theft apparatus that uses vehicle position information.

Japanese Laid-Open Patent Publication No. 11-091510 describes a conventional immobilizer system. The immobilizer system includes a transponder, which is incorporated in a portable device such as an ignition key, and an anti-theft apparatus, which is installed in a vehicle.

In the prior art, the ignition key is inserted in a key cylinder of a vehicle and turned to an ignition position. As a result, the anti-theft apparatus supplies the transponder with electromagnetic energy through radio waves, that is, in a non-contact manner. The transponder, which is activated by the electromagnetic energy, then transmits an ID code, which is stored in the key, as a radio wave having a predetermined frequency. An ID code is registered in the anti-theft apparatus. The anti-theft apparatus enables the engine to be started when the received ID code matches the stored ID code. When the two ID codes do not match, the anti-theft apparatus prohibits the starting of the engine. Accordingly, the starting of the engine is disabled when the ignition key is not authentic. This prevents the vehicle from being stolen.

The conventional anti-theft apparatus performs user authentication through the input of an authorization code when registering the ID code of the ignition key in the anti-theft apparatus. The input of the authorization code is requested to prevent an unauthorized user from registering an ID code. In the prior art, when the authorization code is authenticated and the ID code format of the ignition key matches the ID format set for the vehicle, the ID code of the portable device is registered as the registration ID code in the memory of the anti-theft apparatus. The ID code of the portable device is recorded in the vehicle anti-theft apparatus to enable the user to start the vehicle engine with the portable device. This also disables a third person from starting the engine and thus prevents the vehicle from being stolen.

However, in the conventional vehicle anti-theft apparatus, when a portable device having an ID code with a format matching the ID code format set for a vehicle is available for a third person who knows how to register the ID code, the third person may re-register the ID code in the vehicle anti-theft apparatus. Therefore, there is a possibility of the vehicle being used by the third person.

SUMMARY OF THE INVENTION

One aspect of the present invention is a vehicle anti-theft apparatus for use with a portable device having an ID code to prevent theft of a vehicle. The apparatus includes a first recording circuit for registering the ID code of the portable device. A position determination circuit determines a present position of the vehicle. A second recording circuit registers a predetermined registered position. A control circuit enables registration of the ID code of the portable device in the first recording circuit when the present position of the vehicle matches the registered position.

Another aspect of the present invention is a vehicle anti-theft apparatus for use with a portable device having an ID code to prevent theft of a vehicle. The apparatus includes a first memory for storing the ID code of the portable device. A position determination circuit determines a present position of the vehicle. A second memory stores a predetermined position. A control circuit enables storing of the ID code of the portable device in the first memory when the present position of the vehicle matches the predetermined position.

A further aspect of the present invention is a method for preventing theft of a vehicle. The method includes preparing a portable device having an ID code, preparing an apparatus installed in a vehicle and including a first recording circuit for storing the ID code of the portable device and a second recording circuit for storing a predetermined registered position, determining the present position of the vehicle, and enabling registration of the ID code of the portable device in the first recording circuit when the present position of the vehicle matches the registered position.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An immobilizer system 1 including a vehicle anti-theft apparatus 3 of the present invention will now be described.

Figure 1:
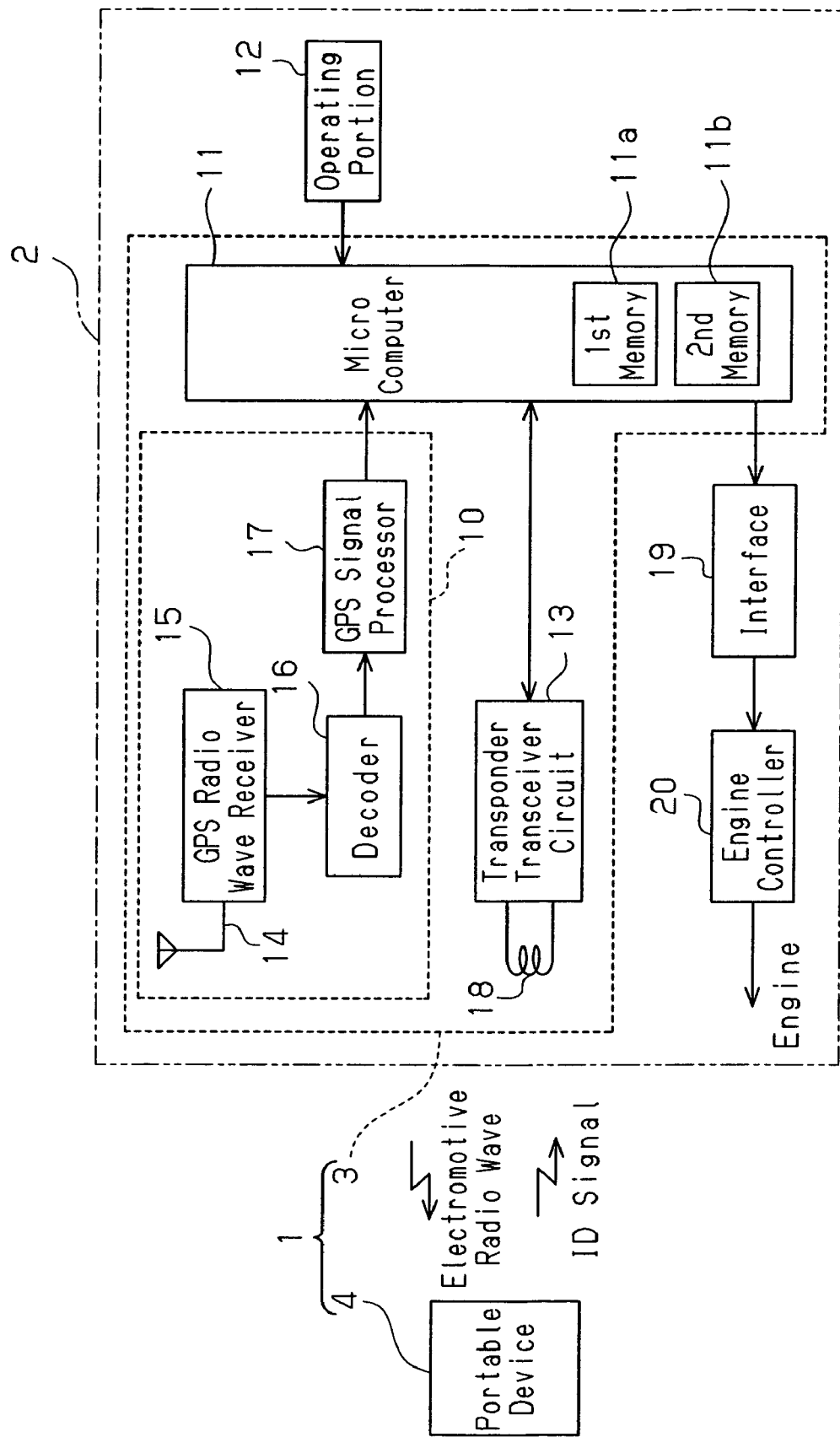
FIG. 1 is a block diagram of a vehicle anti-theft apparatus according to a preferred embodiment of the present invention.

With reference to FIG. 1, the immobilizer system 1 includes the anti-theft apparatus 3, which is installed in a vehicle 2, and a portable device 4.

The portable device 4 includes a portable device microcomputer, a portable device transmitter circuit, a portable device receiver circuit, and a transponder (none shown). The anti-theft apparatus 3 transmits an electromotive radio wave that induces electromotive force at the antenna of the transponder. The electromotive force activates the portable device 4. As a result, the portable device 4 modulates a portable device ID signal, which includes a predetermined ID code, into a radio wave having a predetermined frequency and transmits the radio wave.

The anti-theft apparatus 3 includes a global positioning system (GPS) receiver 10, which determines the position of the vehicle 2, and an immobilizer control circuit 11. The control circuit 11 electrically connects an operating portion 12 and a transponder transceiver circuit 13.

The GPS receiver 10 includes a GPS receiver antenna 14, a GPS radio wave receiver 15, a decoder 16, and a GPS signal processor 17. The GPS receiver antenna 14 receives radio wave signals transmitted from artificial satellites (GPS satellites) and provides the signals to the GPS radio wave receiver 15. The GPS radio wave receiver 15 provides the decoder 16 with the received signals. The decoder 16 demodulates the received signals and provides the demodulated signals to the GPS signal processor 17. The GPS signal processor 17 processes the demodulated signals to generate position data and provides the position data to the control circuit 11. The GPS receiver 10 may also generate and provide the position data in response to a request signal from the control circuit 11.

The operating portion 12 includes an engine starting switch, such as a push button or a knob. The operating portion 12 provides the control circuit 11 with an operation signal corresponding to how the operating portion 12 is operated.

The transponder transceiver circuit 13 converts a transponder activation signal provided from the control circuit 11 into a radio wave having a predetermined frequency and transmits a transponder activation radio wave from an antenna 18. The antenna 18 of the transponder transceiver circuit 13 receives the portable device ID signal, which is transmitted from the portable device 4. The transponder transceiver circuit 13 demodulates the portable device ID signal to generate a received ID signal and provides the control circuit 11 with the received ID signal.

The control circuit 11 includes a central processing unit (CPU), a read only memory (ROM), a random access memory (RAM), a first memory 11a, and a second memory 11b. The first memory 11a and the second memory 11b are non-volatile memories. The second memory 11b stores position information of a predetermined registered position (in the preferred embodiment, the location of a car dealer). Further, the second memory 11b stores a mode switching code and an ID code format set in accordance with each type of vehicle (hereinafter referred to as registered ID format). The mode switching code is a code that can only be known to an authorized person. The mode switching code is, for example, the number of times the operating portion 12 is operated during a predetermined time.

When recognizing that the portable device 4 has been inserted in a portable device slot of the vehicle 2, the control circuit 11 provides the transponder transceiver circuit 13 with the transponder activation signal. More specifically, the control circuit 11 determines whether the portable device 4 is inserted in the portable device slot based on a detection signal provided from a sensor, such as a mechanical switch, that is arranged in the portable device slot. When the portable device 4 is inserted, the control circuit 11 generates the transponder activation signal.

When receiving an operation signal from the operating portion 12, the control circuit 11 checks whether the operation signal has a pattern matching the mode switching code. When the pattern of the operation signal matches the mode switching code, the control circuit 11 determines that user verification has been accomplished and switches to a registration mode. If the user verification is not accomplished, the control circuit 11 does not switch to the registration mode.

The control circuit 11 checks whether the information of the present position of the vehicle received from the GPS signal processor 17 matches the information of the registered position recorded in the second memory 11b. Further, the control circuit 11 checks whether the format of the ID code included in the received ID signal from the transponder transceiver circuit 13 matches the registered ID format.

Figure 2:
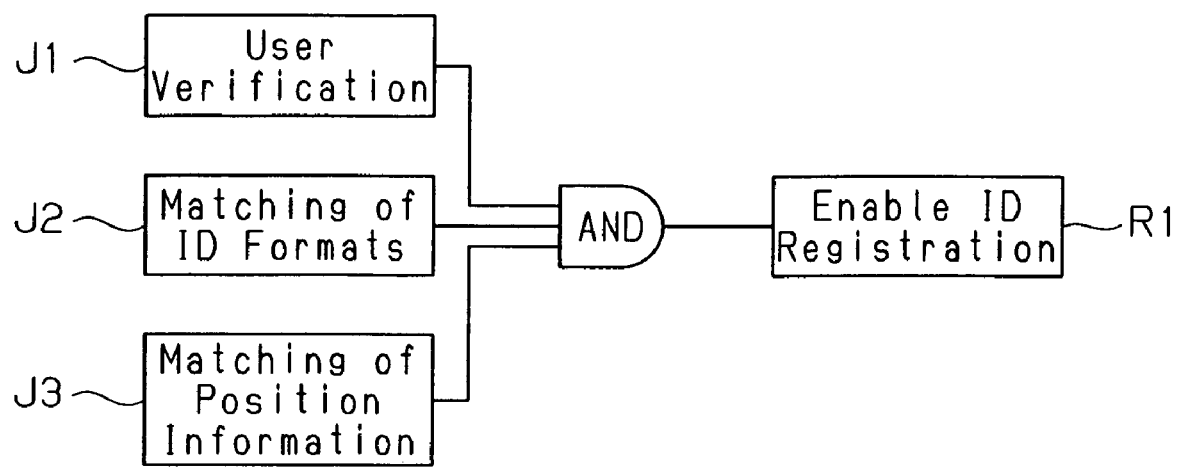
FIG. 2 is a schematic diagram showing the conditions that are required to register a received ID code in a second memory.

Referring to FIG. 2, the control circuit 11 records an ID code to the first memory 11a (result R1) when three conditions are satisfied. The three conditions are accomplishment of the user verification (condition J1), matching of the formats of the received ID code and the registered ID (condition J2), and matching of the present position of the vehicle 2 and the registered position (condition J3). A logical AND operation is performed with the conditions J1 to J3 when recording the received ID code to the first memory 11a. Accordingly, the control circuit 11 disables the recording of the received ID code to the first memory 11a when the present position of the vehicle 2 does not match the registered position.

After recording the received ID code to the first memory 11a, the control circuit 11 switches from the registration mode to a verification mode. In the verification mode, the control circuit 11 compares the received ID code with the registered ID code when receiving the received ID code from the transponder transceiver circuit 13. When the two ID codes match, the control circuit 11 provides an ID matching code from an interface 19 to an engine controller 20.

In response to the ID matching signal, the engine controller 20 enables the starting of the engine. In a state in which the starting of the engine is enabled, the engine is started when the operating portion 12 is operated.

The procedures for registering the ID code of the portable device 4 in the vehicle 2, or the first memory 11a of the control circuit 11, will now be discussed.

To register the ID code of the portable device 4, a user inserts the portable device 4 in the portable device slot of the vehicle 2. The user then operates the operating portion 12 in accordance with a predetermined procedure to input the mode switching code. If the format of the ID code recorded in the portable device 4 matches the registered ID format while the present position of the vehicle 2 during the registration matches the registered position, the ID code of the portable device 4 is registered in the vehicle 2.

When the format of the ID code recorded in the portable device 4 differs from the registered format or when the present position of the vehicle 2 differs from the registered position, the ID code of the portable device 4 cannot be registered in the vehicle 2 even if the operating portion 12 is operated in accordance with the predetermined procedure. Accordingly, the engine of the vehicle 2 cannot be started with the portable device 4.

The anti-theft apparatus 3 of the preferred embodiment has the advantages described below.

(1) The control circuit 11 records the ID code of the portable device 4 (received ID code) to the first memory 11a when the present position of the vehicle 2 matches the predetermined registered position. Since the ID code of the portable device 4 can be registered only at the predetermined registered position, the ID code of the portable device 4 cannot be re-registered if the vehicle 2 is stolen and sent to another country. Since a third person who steals the vehicle 2 cannot start the engine, this deters theft of the vehicle 2.

(2) The control circuit 11 provides the engine controller 20 with the ID matching signal when the ID code transmitted from the portable device 4 matches the registered ID code. The engine controller 20 enables the starting of the engine in response to the ID matching signal. A third person who steals the vehicle 2 cannot re-register the ID code of a portable device that is available to that person. Since a third person who steals the vehicle 2 cannot drive the vehicle 2, this deters theft of the vehicle 2.

(3) The control circuit 11 recognizes the present position of the vehicle 2 based on the position information provided from the GPS receiver 10. Accordingly, the present position of the vehicle 2 may easily be determined.

(4) The control circuit 11 records the received ID code as the registered ID code in the first memory 11a when the user verification is accomplished, the present position information of the vehicle 2 matches the registered position information, and the format of the received ID code matches the registered ID format. This prevents a third person from re-registering the ID code and deters theft of the vehicle 2.

(5) When the registered position is the location of a car dealer, the ID code of the portable device 4 is recorded to the first memory 11a only at the car dealer. Thus, a third person who steals the vehicle 2 cannot register an ID code with a portable device available to that third person unless the vehicle 2 is at the car dealer. Such a situation will most likely not occur. Accordingly, this deters theft of the vehicle 2.

(6) After the user verification is accomplished, the control circuit 11 determines whether the present position information of the vehicle 2 matches the registered position information and whether the format of the received ID code matches the registered ID format. Accordingly, when the ID code of the portable device 4 is not registered in the vehicle 2, the flow of dark current in the anti-theft apparatus 3 is suppressed.

It should be apparent to those skilled in the art that the present invention may be embodied in many other specific forms without departing from the spirit or scope of the invention. Particularly, it should be understood that the present invention may be embodied in the following forms.

The control circuit 11 may recognize the present position of the vehicle 2 based on position information provided from a car navigation system.

The circuit that determines the position is not limited to a GPS receiver 10. On other words, instead of using the position information provided from the GPS receiver 10, the control circuit 11 may recognize the present position of the vehicle 2 based on radio waves transmitted from a base station, such as a base station for a personal handy-phone system (PHS).

The position information of the predetermined registered position (location of the car dealer) is recorded in the second memory 11b. However, position information of a tolerable range around the registered position may be recorded in the second memory 11b in lieu of the registered position. For example, the registered position and a tolerable distance (radius) from the registered position may be recorded to indicate the tolerable range. This would enable the ID code of the portable device 4 to be registered even if the present location of the vehicle 2 does not exactly match the registered position. Thus, the time required for the registration would be shortened. Accordingly, the convenience of the anti-theft apparatus 3 is improved.

The control circuit 11 switches to the registration mode when the user verification is accomplished. In the registration mode, the control circuit 11 records the ID code in the first memory 11a when the present position of the vehicle 2 and the registered position match and the format of the received ID code and the registered ID format match. However, the order in which the three conditions for recording the ID code of the portable device 4 to the first memory 11a is not limited to the order of the preferred embodiment. For example, the control circuit 11 may switch to the registration mode when the present position of the vehicle 2 and the registered position match and record the ID code to the first memory when the user verification is accomplished in the registration mode while the format of the received ID code and the registered ID format match.

The control circuit 11 records the ID code to the first memory 11a upon satisfaction of the three conditions, which are the user verification being accomplished, the format of the received ID code matching the registered ID format, and the present position of the vehicle 2 matching the registered position. However, the control circuit 11 may record the ID code to the first memory 11a when the present position of the vehicle 2 matches the registered position and the user verification is accomplished. Alternatively, the control circuit 11 may record the ID code to the first memory 11a when the present position of the vehicle 2 matches the registered position and the format of the received ID code matches the registered ID format. This would also enable the ID code to be recorded in the first memory 11a only at the predetermined registered location. Accordingly, theft of the vehicle 2 would be deterred.

The locations of a plurality of car dealers, such as the location of every car dealer in a certain nation or the locations of every car dealer in a certain area (state or city), may be recorded in the second memory 11b. Further, the locations of vehicle maintenance garages may be recorded in the second memory 11b. This would enable the ID code of the portable device 4 to be registered in the vehicle 2 even after the owner of the vehicle 2 moves to another home. Thus, the convenience of the anti-theft apparatus 3 would be improved.

The present examples and embodiments are to be considered as illustrative and not restrictive, and the invention is not to be limited to the details given herein, but may be modified within the scope and equivalence of the appended claims.

What is claimed is:

1. A vehicle anti-theft apparatus for use with a portable device having an ID code to prevent theft of a vehicle, the apparatus comprising:
   a first recording circuit that registers the code of the portable device;
   a position determination circuit that determines a present position of the vehicle;
   a second recording circuit that registers a predetermined registered position; and
   a control circuit that enables registration of the ID code of the portable device in the first recording circuit based on the present position of the vehicle corresponding with the registered position.

2. The apparatus according to claim 1, wherein the control circuit enables the vehicle to be driven when the ID code of the portable device matches the ID code registered in the first recording circuit.

3. The apparatus according to claim 1, wherein the position determination circuit determines the present position of the vehicle based on radio wave signals from global positioning system satellites.

4. The apparatus according to claim 1, wherein the ID code of the portable device has a predetermined format, and the vehicle has an ID format, the control circuit registering the ID code of the portable device in the first recording circuit when the present position of the vehicle matches the registered position recorded in the second recording circuit while at least one of conditions including accomplishment of user verification and matching of the code format of the portable device and the format of the vehicle is satisfied.

5. The apparatus according to claim 4, wherein the control circuit performs a first check for checking whether the present position of the vehicle matches the registered position and a second check for checking whether the code format of the portable device and the format of the vehicle match, the control circuit:

performing either one of the first check and the second check when the user verification is accomplished;

performing the other one of the first check and the second check when the positions or formats match in the either one of the first check and the second check; and enabling the registration of the code of the portable device to the first recording circuit when the positions or formats match in either one of the first check and the second check.

6. The apparatus of claim 1, wherein:
the first recording circuit is a first memory location; and
the second recording circuit is a second memory location.

7. The apparatus according to claim 1, wherein the position determination circuit includes a signal processor of a satellite-based navigation system.

8. The apparatus according to claim 1, wherein the portable device transmits the ID code of the portable device in a predetermined format, the vehicle has an ID format, and conditions including accomplishment of user verification and matching of the ID code format of the portable device and the ID format of the vehicle is satisfied.

9. A method for preventing theft of a vehicle, the method comprising:
providing a portable device having an ID code;
storing the ID code of the portable device and a predetermined registered position;
in the vehicle;
determining the present position of the vehicle; and
enabling registration of the ID code of the portable device in the first recording circuit based on the present position of the vehicle corresponding with the registered position.

10. The method according to claim 9, further comprising:
enabling the vehicle to be driven when the ID code of the portable device matches the ID code registered in the first recording circuit.

11. The method according to claim 9, wherein said determining the present position includes determining the present position of the vehicle based on radio wave signals from global positioning system satellites.

12. The method according to claim 9, wherein the code of the portable device has a predetermined format, and the vehicle has an ID format, said enabling registration of the ID code of the portable being performed in addition to when the positions match when at least one of conditions including accomplishment of user verification and matching of the ID code format of the portable device and the ID format of the vehicle is satisfied.

13. A method of restricting vehicle configuration to set of at least one authorized service provider, the method comprising:
providing a configurable feature in a vehicle, the configurable feature having a use mode of operation and a configuration mode of operation;

pre-registering, in the vehicle, a set of at least one location of the at least one authorized service provider;

automatically determining, by the vehicle, a present location of the vehicle; and automatically restricting, by the vehicle, access to the configuration mode of operation of the configurable feature such that the configuration mode of operation is unavailable when the present location of the vehicle is other than proximate to any of the at least one location of the at least one authorized service provider.

14. The method of claim 13, wherein providing the configurable feature includes providing an and-theft apparatus that wirelessly communicates with a portable device having an ID code, wherein the anti-theft apparatus grants certain access to the vehicle only upon demonstration of a valid ID code by the portable device.

15. The method of claim 13, further comprising:
operating the configurable feature in its use mode of operation wherein the configurable feature performs a verification function; and
operating the configurable feature in its configuration mode of operation wherein the configurable feature performs a registration function.

16. The method of claim 13, wherein automatically determining a present location of the vehicle includes automatically operating an in-car navigation system to determine the present position based on received radio signal.

17. The method of claim 13, further comprising:
performing a user verification; and
automatically restricting access to the configuration mode of operation of the configurable feature such that the configuration mode of operation is available only when the user verification is successfully accomplished.

18. The method of claim 13, wherein pre-registering a set of at least one location of at least one authorized service provider in the vehicle includes pre-registering a location of at least one vehicle dealer that is an authorized service provider.

19. The method of claim 13, further comprising:
specifying a position tolerance that defines a range of proximity; and
wherein the automatically restricting access to the configuration mode of operation is further based on the position tolerance.

20. The method of claim 13, further comprising:
permitting operation of the configurable feature in its use mode of operation regardless of the present location of the vehicle.

* * * * *